(12) United States Patent
Sano (10) Patent No.: US 6,491,854 B1
(45) Date of Patent: Dec. 10, 2002

(54) METALLIC MOLD FOR TIRE CURING AND PROCESS FOR PRODUCING THE SAME

(75) Inventor: Takuzou Sano, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/453,499

(22) Filed: Dec. 3, 1999

(30) Foreign Application Priority Data

Dec. 10, 1998 (JP) .......................................... 10-351547

(51) Int. Cl.⁷ .......................... B29C 33/42; B29C 35/02
(52) U.S. Cl. ........................ 264/219; 164/24; 249/135; 264/326; 425/31; 425/812
(58) Field of Search ................................. 264/219, 225, 264/227, 326; 425/46, 812, 31, 32; 249/116, 135; 164/15, 23, 24

(56) References Cited

U.S. PATENT DOCUMENTS 5,368,799 A * 11/1994 Galli et al. ................. 264/219
5,866,171 A * 2/1999 Kata .......................... 425/812

FOREIGN PATENT DOCUMENTS

GB        2 026 376     *   2/1980

* cited by examiner

*Primary Examiner*—Mathieu D. Vargot
(74) *Attorney, Agent, or Firm*—Rader, Fishman & Grauer PLLC

(57) ABSTRACT

A metallic mold for tire curing is disclosed, which comprises a plurality of pieces for forming a tread pattern of a tire by sections, the pieces being fixed to a back block and arranged in an annular form. In this case, each piece is composed of a plurality of piece block layers laminated by performing a plurality of shots of die casting for metallic materials, and a very small gap is formed in a joined portion between the piece blocks by means of coagulation and contraction of the metallic materials. Because of this constitution, formation of a gap having necessary exhaust performance in an optional position of a molding surface can be facilitated. Accordingly, an appearance of a produced tire can be improved without preventing spew formation, and the production of defectives can be reduced during curing and molding.

8 Claims, 6 Drawing Sheets

METALLIC MOLD FOR TIRE CURING AND PROCESS FOR PRODUCING THE SAME

BACKGROUND OF THE INVENTION

The present invention relates to a metallic mold for tire curing, which includes a plurality of pieces used to form a tire tread pattern by sections, and a process for producing the same. More specifically, the invention relates to a metallic mold for tire curing, which is capable of improving an appearance of a produced tire by preventing spew formation, and also capable of reducing the production of defectives during curing and molding, and a process for producing the same.

Conventionally, regarding a sector mold used as one of metallic molds for tire curing, a sector is formed by arranging a plurality of pieces in an adjacent relation to each other, the pieces having concave parts and convex parts corresponding to a profile of a tread section of a produced tire, and then fixing these pieces to a back block. Then, an annular sector mold is made by interconnecting a plurality of such sectors.

It has been known that during tire curing and molding, air is left or gas is generated between an outer peripheral surface of the tire and a molding surface of the metallic mold to form very small concaves in the surface of the produced tire and, consequently, a defective product is produced. To deal with this problem, an air vent through-hole called a vent hole or an exhaust groove called a vent groove has conventionally been formed in the molding surface of the metallic mold.

However, a rubber material flows into the vent hole or the vent groove during tire curing and molding to form spews (or flashes: whisker-like protruding portions) in the surface of the produced tire. This necessitated finishing work to be carried out for removing the spews after molding. But even the removal of the spews didn't erase traces thereof. Thus, an appearance of the produced tire was damaged, and tire noises were increased.

Under these circumstances, in recent years, in order to improve an appearance of the tire and reduce the production of defectives during tire curing and molding, a spewless mold including a slit vent composed of a very small gap has been made available without forming any vent holes or vent grooves in the molding surface.

Regarding such a spewless mold, for example, the followings have been presented: ① Japanese Patent Laid-Open Hei 4 (1992)-223108 (Title of the Invention: METALLIC MOLD FOR CURING UNCURED TIRE CARCASS, PROCESS FOR PRODUCING THE SAME, AND TIRE CURING PROCESS USING THE SAME); and ② Japanese Patent Laid-Open Hei 10 (1998)-24423 (Title of the Invention: METALLIC MOLD FOR TIRE CURING, AND PROCESS FOR PRODUCING THE SAME).

The process disclosed in the former invention ① is for assembling back blocks for forming a tire tread pattern by sections divided in a pitch, and then sucking air existing between the tire and a metallic mold through a gap provided between back blocks. The process disclosed in the latter invention ② is for casting a matrix metal (aluminum) to form a pattern piece around a core piece of a different kind of metal (SS400), and then discharging air through a gap formed at a tire curing temperature (160°) based on a difference in a linear thermal expansion coefficient between the metals. In addition, for a slit vent mold, there is available a method of venting air by providing a level difference between pieces by means of machine work or inserting a spacer between the pieces.

However, in the case of the invention ①, it is difficult to secure a proper air vent in an optional position, and it is always necessary to install a vacuum device or the like as exhaust means. In the case of the invention ②, a sufficient volume must be provided for forming a gap based on a difference in a linear thermal expansion coefficient between the metals, and it is difficult to secure a necessary gap quantity in an optional position. Thus, it is difficult to substantially vent air from the metallic mold.

SUMMARY OF THE INVENTION

It is an object of the present invention to provide a metallic mold for tire curing, which is capable of facilitating formation of a gap having necessary exhaust performance in an optional position in a molding surface, thus preventing spew formation to improve an appearance of a produced tire, and also capable of reducing production of defectives during curing and molding. It is another object of the invention to provide a process for producing the metallic mold.

In order to achieve the above object, in accordance with the present invention, a metallic mold for tire curing comprises a plurality of pieces for forming a tread pattern of a tire by sections, the pieces being fixed to a back block and arranged in an annular form. In this case, each of the pieces is composed of a plurality of piece block layers laminated by performing a plurality of shots of die casting for metallic materials, and a very small gap is formed in a joined portion between the piece blocks by means of coagulation and contraction of the metallic materials.

In accordance with the present invention, a process for producing the tire curing metallic mold comprises the steps of:

performing a first shot of die casting to cast a molten metallic material in a first metallic mold, and forming a first piece block having a partial molding surface corresponding to a tread pattern of a tire; performing a second shot of die casting to cast the same kind of a molten metallic material in a second metallic mold while the first piece block is arranged in the second metallic mold, and forming a second piece block on the first piece block so as to complement the molding surface; and forming a very small gap in a joined portion between the first and second piece blocks by means of coagulation and contraction of the metallic materials.

With the invention, during casting and laminating the plurality of piece block layers constituting each piece by using the same kind of metallic materials, a very small gap is formed in a joined portion between the piece blocks by means of coagulation and contraction of the metallic materials. This very small gap formed by coagulation and contraction of the metallic materials exhibits exhaust performance for discharging only air or gas remaining in the metallic mold well without allowing a rubber material to flow out. Accordingly, a gap having necessary exhaust performance for a spewless mold can be easily formed in an optional position of the molding surface based on the arrangement of the joined portion, and the production of defectives can be reduced during curing and molding while preventing spew formation.

Moreover, a tire appearance can be improved without performing spew removal after tire curing or without leaving any spew traces on a tire surface, the spew traces causing deteriorated tire noises.

In accordance with the present invention, a pneumatic tire comprises a tread pattern having no spew traces, which is formed on a tire surface by using the foregoing metallic mold for tire curing.

Furthermore, in accordance with the present invention, a process for producing a pneumatic tire comprises the step of forming a tread pattern having no spew traces on a tire surface by using the foregoing metallic mold for tire curing.

DETAILED DESCRIPTION OF THE PREFERRED EMBODIMENTS

Figure 1:
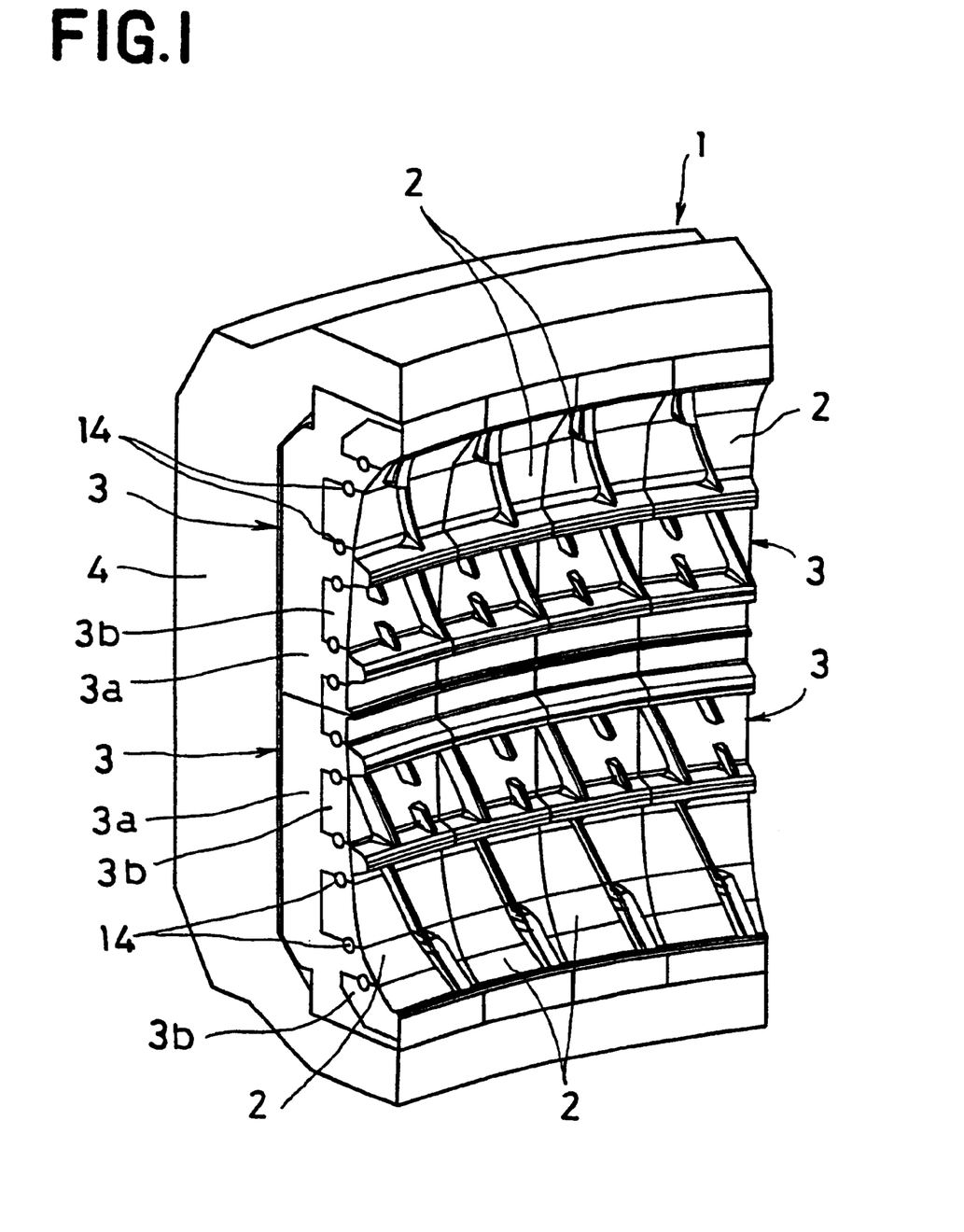
FIG. 1 is a perspective view of one sector constituting a sectional type metallic mold (sector mold) for tire curing according to the present invention.

FIG. 1 illustrates one sector constituting a sectional type metallic mold (sector mold) for tire curing according to the present invention. This sector denoted by a reference numeral 1 is constructed by arranging a plurality of pieces 3 in an adjacent relation to each other, the pieces 3 having concave/convex parts 2 corresponding to a profile of a tread section of a produced tire, and then fixing these pieces 3 to a back block 4.

Figure 2:
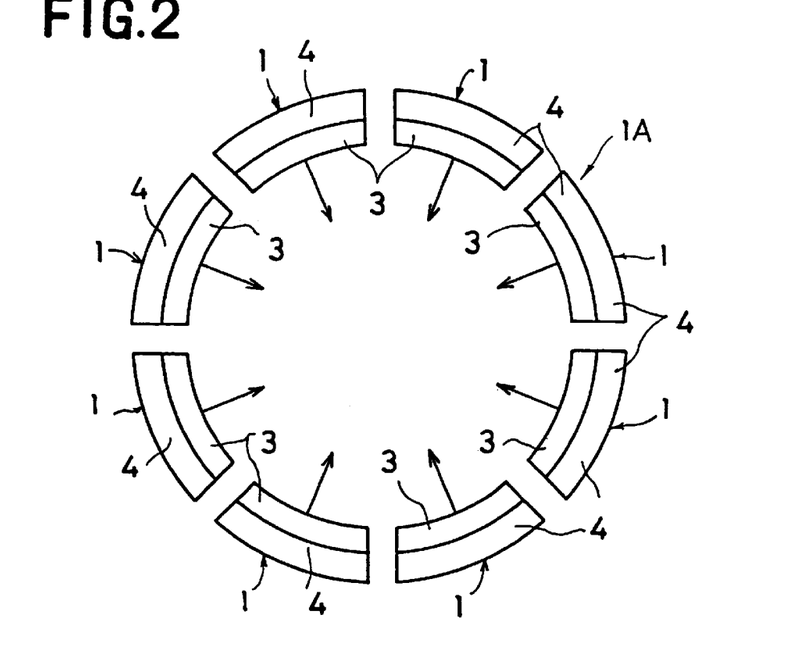
FIG. 2 is a view illustrating a sector mold constituted to be annular by interconnecting a plurality of sectors.

As shown in FIG. 2, a sector mold 1A is constructed by arranging a plurality of sectors 1 in an annular manner. In the embodiment, eight sectors 1 form a set of divided portions of the sector mold 1A. But there should be no limitation placed on the number of sectors. For performing curing of a tire W by using the sector mold 1A, a plurality of sectors 1 are fixed in a metallic mold supporting device 5 known in the prior art like hat shown in FIG. 3.

Figure 3:
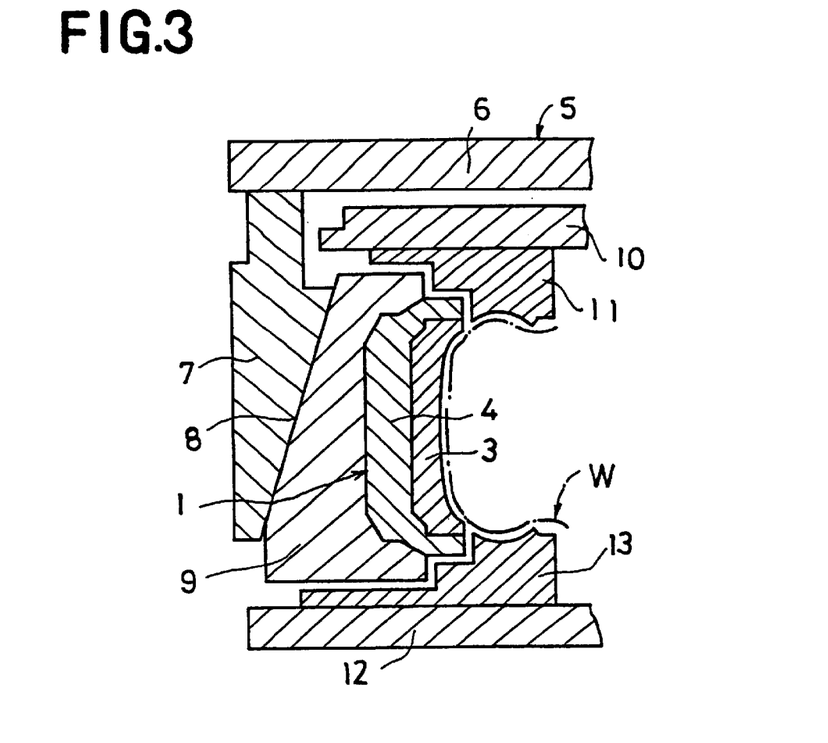
FIG. 3 is a sectional view of a sector mold fixed in a metallic mold supporting device.

The metallic mold supporting device 5 is constructed in a manner that an outer ring 7 is suspended from the lower part of an outer peripheral edge of a disk supporting plate 6, and the sector 1 is attached to a tapered surface 8 in the inner side of the outer ring 7 by interpolating a segment 9. The segment 9 is freely slid up and down with respect to the tapered surface 8, and the sector 1 is expanded/contracted in a diameter direction of the metallic mold based on an up-and-down movement of the supporting plate 6.

An upper side mold 11 is disposed above the sector 1 so as to be vertically moved by interpolating an upper plate 10.

On the other hand, a lower side mold 13 fixed on a base plate 12 is disposed below the sector 1.

During curing of the tire W, the supporting plate 6 is moved downward to slide the segment 9 on the tapered surface 8. Each sector 1 is thereby moved in a centripetal direction (toward a metallic mold center), and the upper and lower side molds 11 and 13 are tightly fixed to upper and lower ends of each sector 1. After the completion of curing, the supporting plate 6 is moved upward to move each sector 1 toward the outside, and the upper side mold 11 is moved upward to release the molded tire W.

As shown in FIG. 1, when the tread pattern of the tire is divided into a plurality of sections at fixed or optional pitches, the plurality of pieces 3 fixed on the back block 4 form the tread pattern by sections. Each of these pieces 3 is composed of first and second piece blocks 3a and 3b, which are formed by laminating metallic materials by a plurality of shots of die casting. In the embodiment, the number of shots of die casting is two. But there should be no particular limitation placed on the number of shots.

Figure 6:
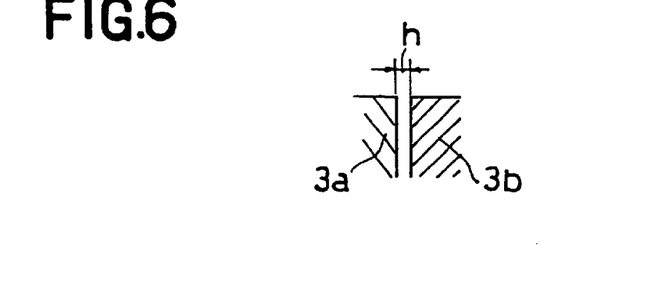
FIG. 6 is an expanded sectional view showing a gap in an A portion of FIG. 5.
Figure 7:
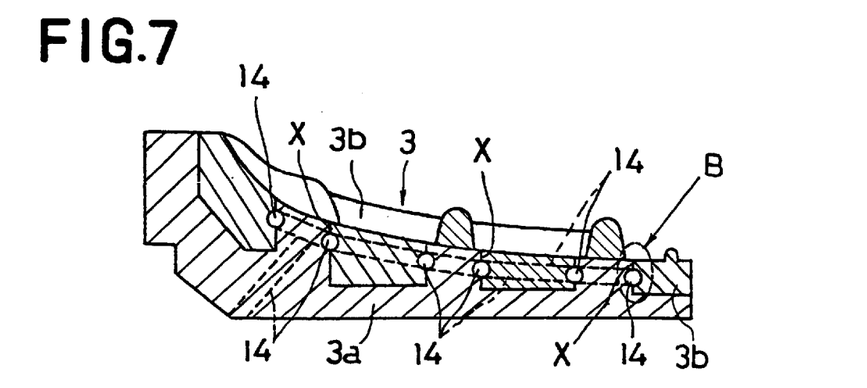
FIG. 7 is a sectional view of a piece obtained by casting the first piece block and the second piece block in a united relation to each other.
Figure 8:
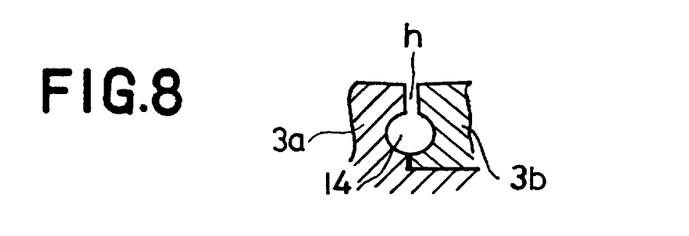
FIG. 8 is an expanded sectional view of an exhaust hole communicated with a gap in a B portion of FIG. 7.

In a joined portion X between the casting metallic materials (first and second piece blocks 3a and 3b) by a plurality of shots, a very small gap h is formed by means of coagulation and contraction of the metallic material like that shown in FIG. 6. As casting metallic materials in the embodiment, the same kind of aluminum metal is used for the first and second piece blocks 3a and 3b. Preferably, the very small gap h formed by coagulation and contraction of the metallic materials should be set in a range of 0.005 to 0.08 mm, more preferably 0.02 mm. If this gap h is less than 0.005 mm, then exhaust performance will be insufficient. If the gap h exceeds 0.08 mm, then spew formation will be facilitated. By using the same kind of metallic materials for the first and second piece blocks 3a and 3b, the gap h can be prevented from fluctuating at a tire curing temperature.

Furthermore, according to the embodiment of the invention, an exhaust hole 14 is formed below the molding surface of the piece 3 so as to be communicated with the very small gap h. This exhaust hole 14 is communicated with the backside of the piece 3 to discharge air or gas remaining in the metallic mold into atmosphere.

Next, description will be made of a process for producing a metallic mold for tire curing according to the present invention by referring to FIGS. 4 to 9.

Figure 4:
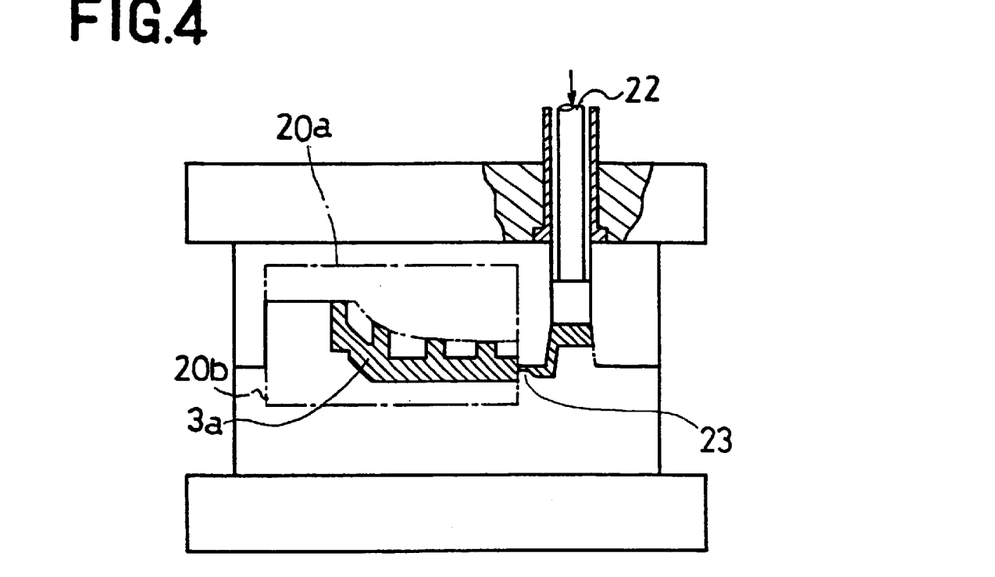
FIG. 4 is a view illustrating a process for producing a first piece block cast by means of a first shot of die casting.
Figure 5:
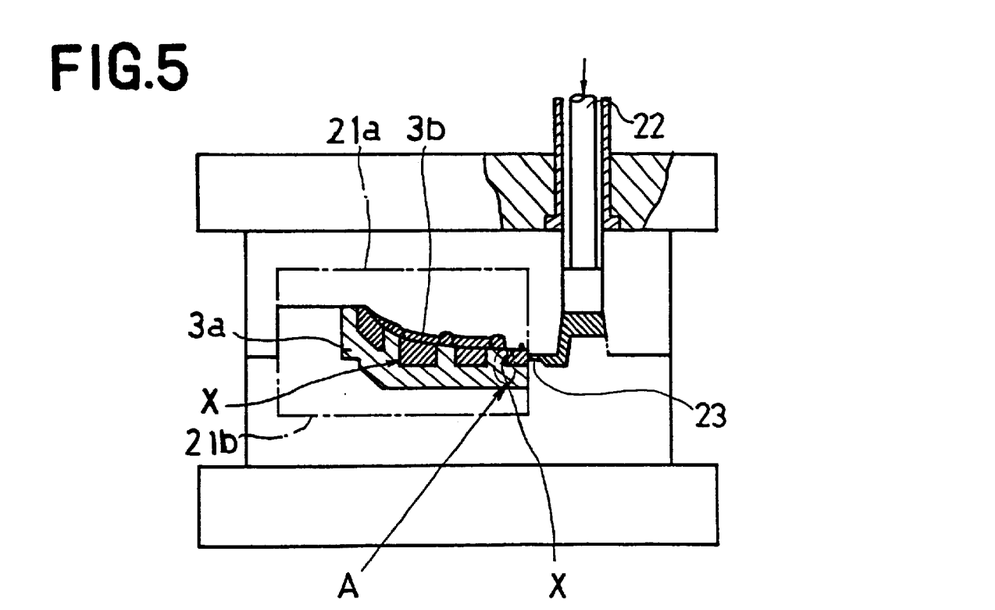
FIG. 5 is a view illustrating a process for producing a second piece block cast by means of a second shot of die casting.

First, prior to the process for producing a metallic mold for tire curing, first divided metallic molds 20a and 20b and second divided metallic molds 21a and 21b are prepared: the former serving as pattern insert dies used in a first shot step of die casting shown in FIG. 4, and the latter serving as pattern insert dies used in a second shot step of die casting shown in FIG. 5. In each of FIGS. 4 and 5, molten metal materials are pressed by a piston 22, and then injected into the pattern insert dies through a gate 23.

By using these first and second divided metallic molds 20a and 20b and 21a and 21b, the piece 3 of the metallic mold for tire curing can be produced by the following steps ① to ④.

① First Shot of Casting

In step of a first shot of casting, molten metal (aluminum or aluminum alloy in the embodiment) is cast through the gate 23 by using the first divided metallic molds 20a and 20b as insert dies for a first shot shown in FIG. 4. Then, a first piece block 3a is cast to have a partial molding surface corresponding to a tread pattern of the tire W and an area for laminating a second piece block 3b.

After having been cast, the first piece block 3a is subjected to machine work. For example, the first piece block 3a may be machined in an undercut structure so as to prevent the first piece block 3a and the second piece block 3b for a second shot from being disassembled. When necessary, the machine work can be carried out in order to change the kind, shape or dimension of the tread pattern. Further, work may be carried out so as to supply molten metal to a thin frame of the tread pattern or insert a sipe.

② Second Shot of Casting

Figure 9:
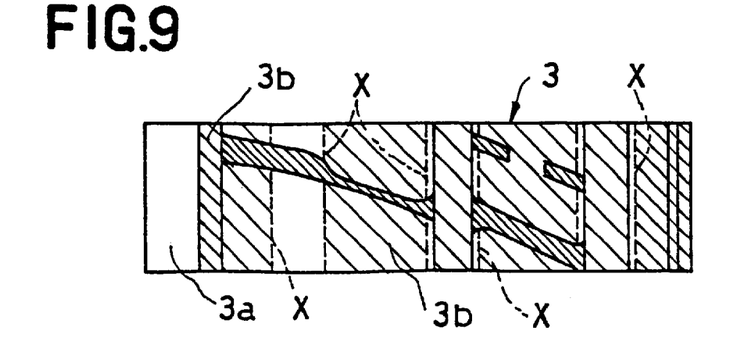
FIG. 9 is a plan view of a piece obtained by casting the first piece block and the second piece block in a united relation to each other.

The first piece block 3a produced in the first shot step of casting is arranged in the second divided metallic molds 21a and 21b as shown in FIG. 5, and clamped so as to tightly fix the molding surface of the first piece block 3a to the inner surface of the metallic mold 21a. Then, the same kind of molten metal is cast through the gate 23 to cast the second piece block 3b on the first piece block 3a, the second piece block 3b serving to complement the molding surface of the tread pattern. By strongly performing the above clamping, the molten metal for the second shot can be prevented from flowing in between the molding surface of the first piece block 3a and the inner surface of the metallic mold 21a. Accordingly, a vent mechanism provided by the gap h can be surely exposed on the molding surface of the piece 3. By going through the second shot step of casting, as shown in each of FIGS. 7 and 9, the piece 3 composed of a laminate including the piece blocks 3a and 3b can be provided. In FIG. 9, hatched portions indicate the exposed parts of the second piece block 3b, and portions other than the above indicate the exposed parts of the first piece block 3a.

A casting condition for forming the very small gap h by means of coagulation and contraction of metallic materials in the second shot in the joined portion X between the piece blocks 3a and 3b may be set based on the following factors (a) to (d).

(a) Injection Speed for Die Casting

In die casting, generally, as a piston speed and a gate speed are faster, a good casting having a small number of casting defects in the tread pattern is produced. But as these speeds are fast, a very close relationship is set between the first and second shots to make it difficult to form the gap h (slit). Thus, an injection speed should preferably be set slow for die casting.

In die casting, as an injection speed is slower, air is prevented from flowing into the molten metal material. As an injection speed is faster, a surface shape has a better appearance. Thus, the process of the invention should be carried out in a manner that a low injection speed is selected at a starting time, then the injection speed is gradually increased, and a stroke end is reached at a fast speed.

(b) Gate

If the gate is thick (e.g., equal to 3.5 mm or higher), an injection pressure is transmitted more than necessary. Consequently, neither coagulation nor contraction occurs, and the gap h (slit) cannot be formed. Thus, a best thickness of the gate is in a range of 0.8 to 2.5 mm. The gate should be provided such that the molten metal can uniformly flow into a recessed groove, and in a place into which the molten metal easily flows.

(c) Bath Temperature of Molten Metal

Generally, a bath temperature is set in a range of 650 to 720° C., but it should be set low in a range for enabling casting. If the bath temperature is high, then the pattern insert and the casting will be tightly fixed to each other. Consequently, mold releasing will be difficult, and the gap h will not be formed.

(d) Injection Pressure

Generally, a piston injection pressure for a good die casting is set in a range of 600 kgf/cm$^2$ to 1,200 kgf/cm$^2$. This injection pressure is an optimal pressure for the first shot of casting, but not suited for the second shot of casting.

In other words, if a high pressure is applied during the second shot, neither metal coagulation nor contraction occurs, and it is difficult to form the very small gap h in the joined portion X. Thus, an injection pressure for the second shot should preferably be set to be about 50% of that for the first shot, i.e., in a range of 300 kgf/cm$^2$ to 800 kgf/cm$^2$.

Needless to say, various casting conditions come to play their roles in a complicated manner. By increasing a gap quantity at a low injection pressure (i.e., 0.08 mm or higher), the occurrence rate of rubber overflowing in the slit vent will be increased. At a high injection pressure, the deposited metal in the joined portion X will be joined tightly, and the gap quantity will approach zero without limit. Consequently, an air venting effect will not be provided.

③ Formation of Exhaust Hole Communicated with the Gap

After the production of the piece 3 by laminating the first and second piece blocks 3a and 3b by means of die casting, an exhaust hole 14 is formed below the molding surface of the tread pattern by machine work so as to be communicated with the very small gap h.

④ Leakage Test

In order to determine sure formation of the slit vent composed of the gap h, verification is made as to a leaking state by dipping the piece 3 in a water tank or the like, and then applying an air pressure of 0.1 to 2.0 kgf/cm$^2$. Then, a spewless piece is completed.

A plurality of pieces 3 thus obtained are fixed to the back block 4 without securing any gaps by a spacer or the like. Then, the sector 1 is assembled by tightly welding all the pieces to one another. The sector 1 may be assembled without welding the pieces to one another. Then, by fitting the sector 1 in the segment 9, preparation of tire curing and making machine is completed.

As described above, according to the present invention, during casting and laminating the first and second piece blocks 3a and 3b by using the same kind of metallic materials, the very small gap h is formed by means of metal coagulation and contraction in the joined portion X between the piece blocks 3a and 3b made of the metallic materials by the first and second shots of casting. Accordingly, formation of the gap h for exhaustion can be facilitated without performing any particular work for the pieces or providing any members such as spaces between the pieces during the assembling of the sector 1.

By using the metallic mold for tire curing, which is provided by the present invention, to perform curing and molding for a pneumatic tire, the production of defectives during curing and molding can be reduced while preventing spew formation. In addition, a tire appearance can be improved without removing any spews after tire curing or leaving any spew traces on the tire surface, the spew traces causing deteriorated tire noises.

In the foregoing embodiment, aluminum alloys as the same kind of metal for die casting are used for the first and second shots of die casting. But a metallic mold can be produced by zinc alloy die casting or magnesium alloy die casting. For a material of the back block 4, preferably, an aluminum alloy or steel should be used.

The embodiment has been described based on the case of using the sector mold as a sectional type metallic mold for tire curing, which is constructed by using the plurality of sectors. But the present invention can also be applied to a divisional type metallic mold for tire curing as shown in FIGS. 10 to 12.

Figure 10:
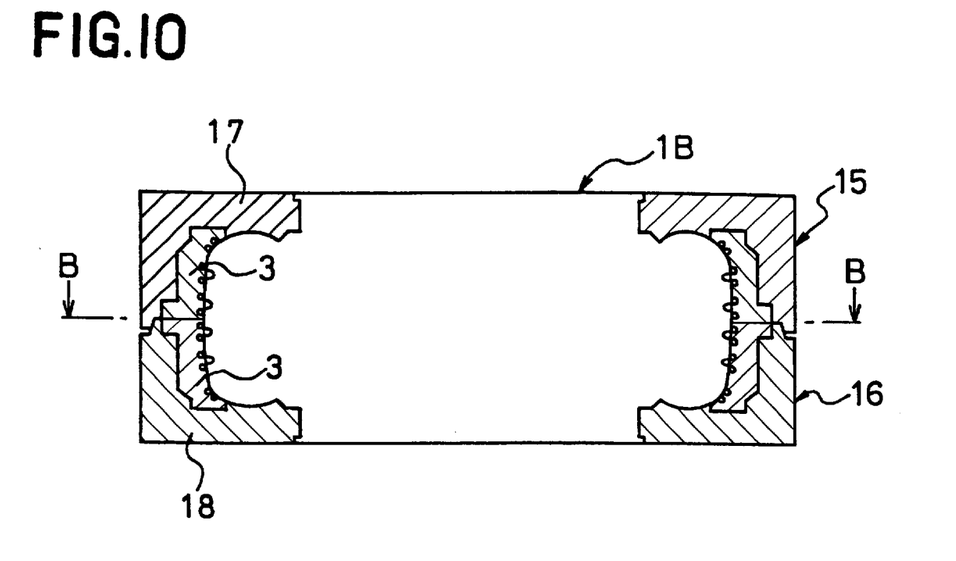
FIG. 10 is a sectional view of a divisional type metallic mold for tire curing according to the invention.

Specifically, FIG. 10 shows a mold 1B, which is divided into two portions: upper and lower molds 15 and 16.

Figure 11:
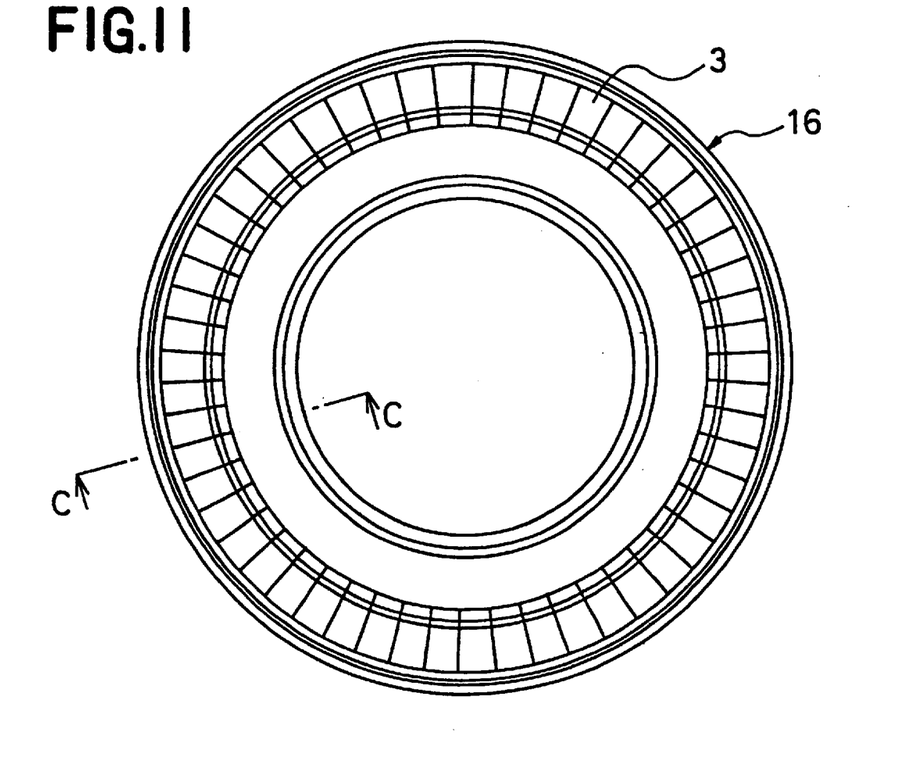
FIG. 11 is a side view taken on line B—B of FIG. 10.
Figure 12:
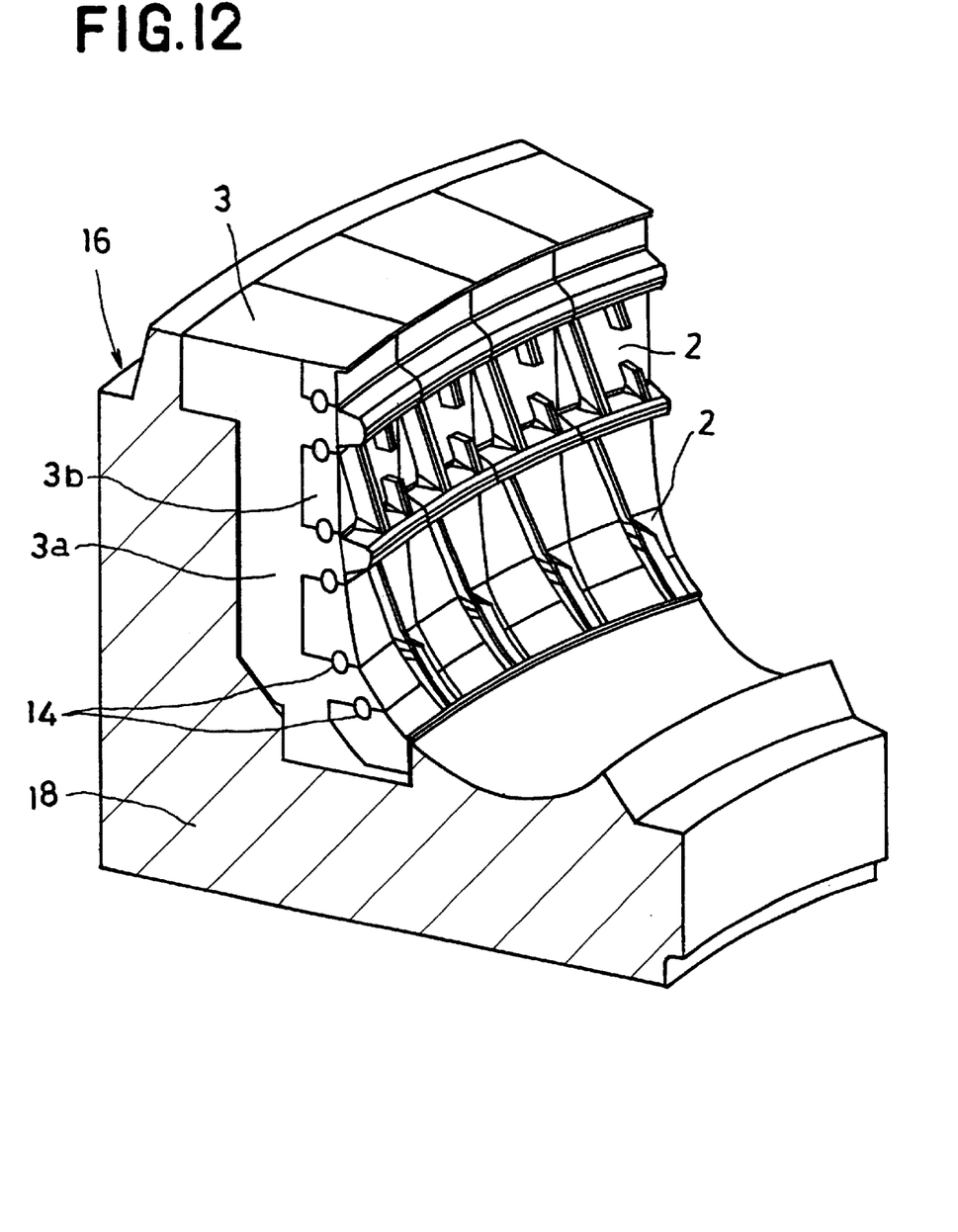
FIG. 12 is a sectional perspective view taken on line C—C of FIG. 11.

FIG. 11 is a view taken on line B—B of FIG. 10, and FIG. 12 is a sectional perspective view taken on line C—C of FIG. 11. The same constituting elements as those of the forgoing sector mold are denoted by the same reference numerals, and description thereof will be omitted. The upper and lower molds 15 and 16 are provided with back rings 17 and 18 respectively from the tread section of the tire to side parts. A plurality of pieces 3 are fixed to the tread forming portions of the back rings 17 and 18.

Also, in the upper and lower divisional type mold 1B, as shown in FIG. 12, each piece 3 is composed of first and second piece blocks 3a and 3b, which are laminated by die casting. A very small gap is formed in a joined portion between the piece blocks 3a and 3b by means of metallic material coagulation and contraction. Accordingly, a necessary slit vent can be easily provided as a spewless mold in an optional position of a molding surface.

Because of the foregoing constitution, the present invention is quite advantageous in the following respects.

For producing the piece by casting and laminating the same kind of metallic materials, in a joined portion between piece blocks made of metallic materials by first and second shots of casting, a very small gap is formed by means of coagulation and contraction of the metallic materials for the second shot. This gap can be used as a vent mechanism for the spewless mold. Thus, it is not necessary to form any gaps between the pieces during assembling of the sector or the like.

By using the same kind of metallic materials to make plural layers of piece blocks, a gap quantity in the joined portion can be verified at a room temperature. Necessary exhaust performance can be secured for the spewless mold.

The gap can be set in a necessary optional position based on the arrangement of the joined portion. The gap quantity can be easily controlled based on the casting conditions for the second shot.

Since a necessary and sufficient exhaust circuit can be provided for the spewless mold, the necessity of a conventional vacuum circuit can be eliminated.

Since the gap discharges only air and gas remaining in the metallic mold well without allowing the rubber material to flow out, the production of defective tires can be prevented during curing and molding while preventing spew formation.

A tire appearance can be improved without performing spew removal after tire curing and without leaving any spew traces on the tire surface, which cause deteriorated tire noises.

What is claimed is:

1. A metallic mold for tire curing comprising a plurality of pieces for forming a tread pattern of a tire by sections, the pieces being fixed to back block and arranged in an annular form, wherein each of said pieces is composed of a plurality of piece blocks laminated by performing a plurality of shots of die casting for metallic materials, and a gap is formed in a joined portion between the piece blocks by means of coagulation and contraction of the metallic materials, wherein said plurality of piece blocks are made of the same kind of metallic materials.

2. A metallic mold for tire curing according to claim 1, wherein each of said pieces is composed of two piece blocks.

3. A metallic mold for tire curing according to claim 1, wherein said gap is formed by coagulation and contraction of the metallic materials and is set in a range of 0.005 to 0.08 mm.

4. A metallic mold for tire curing according to claim 1, wherein an exhaust hole is formed below a molding surface of said pieces to be communicated with said gap.

5. A process for producing a tire curing metallic mold comprising the steps of:

performing a first shot of die casting to cast a molten metallic material in a first metallic mold, and forming a first piece block having a partial molding surface corresponding to a tread pattern of a tire;

performing a second shot of die casting to cast the same molten metallic material as in the first shot above in a second metallic mold while the first piece block is arranged in the second metallic mold, and forming a second piece block on the first piece block to complement the molding surface; and forming a gap in a joined portion between the first and second piece blocks by means of coagulation and contraction of the metallic materials.

6. A process for producing a metallic mold for tire curing according to claim 5, wherein the first piece block formed in the first shot step is formed in an undercut structure by machine work, and then fed to the second shot step.

7. A process for producing a metallic mold for tire curing according to claim 5, wherein an injection pressure for the first shot step is set in a range of 600 to 1,200 kgf/cm$^2$, and an injection pressure for the second shot step is set in a range of 300 to 800 kgf/cm$^2$.

8. A process for producing a pneumatic tire including the step of: forming a tread pattern by using a tire curing metallic mold specified in any one of claims 1, 2, 3 and 4 without leaving any spew traces on a tire surface.

* * * * *